BIMETALLIC COUPLING FOR FLANGED PIPE ELEMENTS
Original Filed Jan. 11, 1956
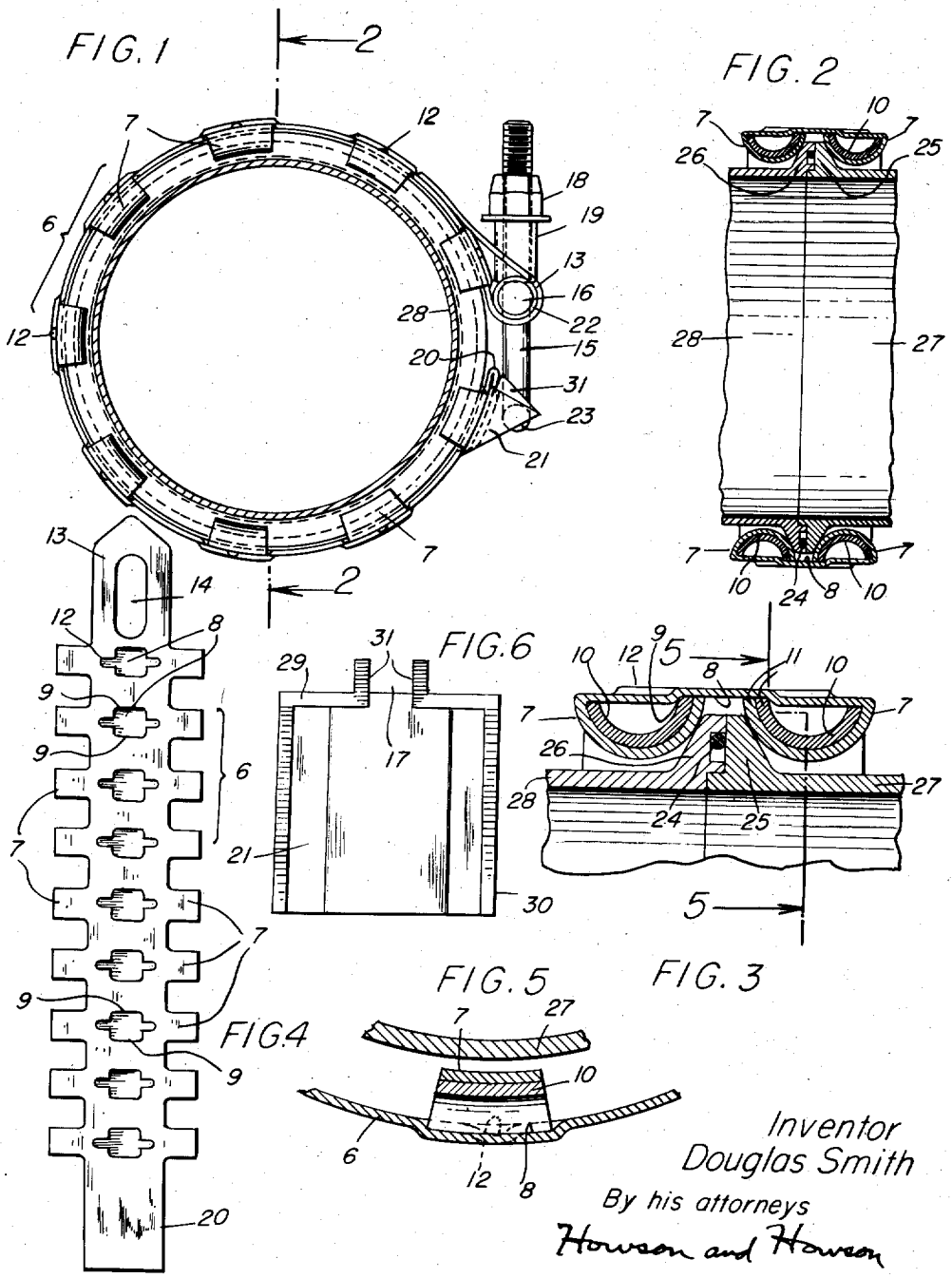
Inventor
Douglas Smith
By his attorneys
Howson and Howson United States Patent Office Re. 24,589
Reissued Jan. 13, 1959

24,589

BIMETALLIC COUPLING FOR FLANGED PIPE ELEMENTS

Douglas Smith, South Norwalk, Conn.

Original No. 2,773,709, dated December 11, 1956, Serial No. 558,505, January 11, 1956. Application for reissue September 2, 1958, Serial No. 757,158

7 Claims. (Cl. 285—187)

Matter enclosed in heavy brackets [ ] appears in the original patent but forms no part of this reissue specification; matter printed in italics indicates the additions made by reissue.

This invention relates to an exterior coupling for flanged pipe elements and more particularly to a quick coupling for joining together coaxially flanged pipe ends or other flanged pipe elements. My copending patent applications Ser. No. 474,072, filed December 9, 1954, for "Coupling for Flanged Pipe Fittings," which application has now matured into Patent No. 2,773,710, dated December 11, 1956, and Serial No. 524,771, filed July 27, 1955, for "Exterior Coupling for Flanged Pipe Fittings," contain claims reading on the disclosure herein.

Where extreme temperatures or pressures are involved and a quick disconnect clamp or coupling of pipe elements is needed, it is customary at the present time to use an external clamp pulled tight around the flanges. At elevated temperatures such as 500° F. or higher, which occur in jet engines, aircraft and guided missiles, it has been found that the expansion of the clamp itself due to heat has made it difficult to maintain the joint tight. Similar conditions also exist sometimes in the chemical industry where substances are kept in bottles which must be capped tightly against all leakage at normal or high pressures or temperatures. Similar conditions also exist in oil refinery piping. The flanged ends of the two pipe elements to be fastened together are sloped toward the end on the inner sides so that when two such flanges are juxtaposed coaxially an external V-shaped rib is formed. It has been common to fasten these two together by means of an external clamp fitting around the outside of the flanges. This clamp generally contains a circular band or ring which is tightened up by means of a bolt, screw, ring or other device. The interior of such clamp presents a tapered surface to the flanges to squeeze them together. As shown in both of the copending applications above referred to, there are bimetallic means near the edges of the band with curled free legs facing inwardly toward the flanges to exercise this squeeze on the flanges. The object of the present invention is to provide a simplified compact structure of this type. Couplings made according to the present invention have indentations on the inner face of the band in each of which the free legs of one or a pair of bimetallic means or retainers rest, the indentation acting as a stop to limit retraction of the retainers under temperature change and to give the necessary pressure on the flanges with a smaller change in band diameter. According to this invention the band and lugs may be all made out of one stamped piece of metal in a unitary manner at the time the indentations are made.

In the drawings:

Fig. 1 is a sectional view in side elevation across two pipe ends on which has been fastened a coupling made in accordance with the invention.

Fig. 2 is a view in section longitudinally of the pipes of Fig. 1 at full diameter, taken on the line 2—2 of that figure.

Fig. 3 is a view on an enlarged scale taken in section through the flanges and clamp of Fig. 2, showing only one side of the pipe.

Fig. 4 is a plan view of the sheet metal blank in the flat which is to constitute the band and lugs of a coupling according to the invention.

Fig. 5 is a view in section through the new coupling, showing the bimetallic retainer resting in a depression in the band, the view being taken on the line 5—5 of Fig. 3 in a direction longitudinally of the pipe ends.

Fig. 6 is a plan view of a socket to hold the head of the bolt.

It will be noted that the couplings shown in the copending applications above referred to are composed of a number of different pieces of metal. Thus, the bimetallic curled members (here called retainers) have been made of entirely separate pieces of material from the band proper. This necessitates allotting sufficient width at each edge of the band to weld the retainers to the band. [It will also be observed in] *In* application Ser. No. 524,771 [that] the stop in back of the free leg of the lug to limit the contraction of the curl is another piece of metal which has to be welded onto the band. *While such a structure provides the desired coaction of parts, it* [it] has been found desirable to make the band as narrow and light as possible, and of as few pieces as necessary to give all the required functions. According to the *preferred form of the* present invention the above-mentioned stops and the outer metal of the bimetallic members are all formed integrally as part of the original band. The only other piece of metal needed is the interior curled piece of higher coefficient of expansion inside each bimetallic retainer, and these do not have to be welded in any way to incorporate them in the novel structure here disclosed.

In the embodiment of my invention shown in the drawings the main structure can be blanked out flat on a power press, the punch not only blanking out the lugs and the shape of the band but also inserting indentations or depressions in the band. These indentations serve several functions, including that of the separate stop for limiting retraction, above referred to. After the coupling has been blanked out, the lugs which are formed at or near each edge of the band are each formed up into a U on the power press. Then the bimetallic inner members are inserted and the press brought down the rest of the way to put the entire bimetallic retainers in their final form. It will be seen that the operation is very simple, no welding is required, and the number of parts is at the minimum. Furthermore, the width of the band is much less than in my earlier constructions—a most desirable feature.

Referring now to the drawings, there is shown in Fig. 4 the unitary band and associated parts as originally blanked out of an embodiment according to the invention. The main part of the band is designated generally by the reference character 6. There are lugs 7 at the two edges of the band, the lugs being located at spaced points and opposite each other. These are all made of the same unitary piece of sheet metal with the band proper, and with the same coefficient of expansion, although different coefficients of expansion in the two parts can be used if desired. There are indentations 8 in the band opposite each pair of lugs 7. These indentations are made toward the center of the pipe ends to be fastened. They are adapted to perform at least three functions in the maintenance and operation of the coupling. The main portion of the indentation is of such dimensions lengthwise of the band 6 that when the lugs are curled over and their free legs are pressed into the depression, the lugs fit in without play circumferentially of the band (see Fig. 5). Inside each curled lug 7 is a curled piece of metal 10 of a higher coefficient of expansion than the lug. The two constitute a bimetallic retainer at each lug location and both rest in the indentation 8 near its side wall 9. These side walls act as a stop against too much contraction of the bimetallic retainer when the coupling is exposed to low temperature. Furthermore, when the band is tightened around the flanges on the pipe ends there is a tendency for the free legs 11 of the lugs and of the metal pieces to be forced back against the stop. Therefore the stop also serves to limit the amount of movement, i. e. tightening of the band, required to obtain a given pressure on the flanges. The pieces of metal 10 are not welded but are merely fitted into position. The act of curling over the lug also curls over the pieces of metal 10, and since these pieces are the same length as the main indentation 8, they are prevented from moving circumferentially relative to the band, and their retention in position is complete.

In addition to the main indentation there are strengthening extensions 12 of the indentation extending toward the edges of the band, stiffening it at points opposite the middle of the lugs.

To pull the two ends of the band together and thereby tighten it around the flanged pipe elements, I employ a T-headed bolt 15, self-locking nut 18 and bushing 19 in connection with the ends of the band, arranged as follows. The upper end of the band as it is shown in Figs. 1 and 4 is folded over upon itself outwardly and spot-welded to itself so that the central slot 14 in it lies like an open slot at this end of the band. This end is designated in the drawings by the reference character 13 and is the one to which the bolt 15 is permanently attached. As shown in Fig. 1, the T-head 23 of the bolt lies in this central slot 14 and the T-head 23 extends from the end 13 of the band to the free end 20 of the band and is there hooked into a slot 17 in a socket 21 welded on the end 20 of the band (see Fig. 1). It will be observed that the end 20 protrudes beyond the band for say a quarter of an inch and the end can be doubled back on itself as shown, thus supporting the weld. The socket has an end wall 29 in which the slot 17 is located (see Fig. 6). This end wall leans away slightly from the end of the band so as to ensure that the head 23 of the bolt will not slip out inadvertently. There are side walls 30 unitary with the end wall to strengthen the latter against the pull of the bolt head. It will be observed that there are wing braces 31 at the sides of the slot 17 which also help to strengthen the end wall. These wing braces can rest on the protruding end 20 of the band. The T-head 23 of the bolt, entering through this slot 17, when pulled up by the nut 18 and bushing 19 will move in against the end wall 29 and pull the free end of the band toward the bolt end.

For the purpose of maintaining the bolt in proper association with the folded-over loop of the bolt end of the band, a cross-head 16 extending laterally under the sides of the end 13 is supplied. This cross-head is surrounded by a sleeve 22 for strength and the sleeve is engaged by bushing 19. When the nut 18 is screwed toward the head of the bolt, the bushing 19 and nut 18 holding against the sleeve 22 and the strap formed by the loop of the bolt end 13 of the band pull the head of the bolt, and therefore the free end of the band, toward the bolt end, thereby tightening the band. When it is desired to disengage the band the bolt is loosened and the T-head is disengaged from the slot 17.

Similarly to the construction shown in my two preceding applications, a metal gasket ring 24 is provided in flange 26 of the left-hand pipe end 28 as they appear in Fig. 3, the flange 25 of the right-hand pipe end 27 closing in the gasket and being complemental to the first flange.

It will be noted that as compared with the bimetallic retainers of my two preceding applications, the width of the band has been reduced because it is not necessary to provide a surface where retainers can be welded to the band. It should further be noted that the independent stops have been done away with entirely *in the preferred form of the invention*, as the indentation in the band itself performs the function of a stop. It should also be noted that the two parts of each bimetallic retainer are held in place and operate without the necessity for any welding. The band itself can be made of any desired metal and may or may not be resilient. The same is true of the bimetallic retainers, provided the inner one has a greater coefficient of expansion.

It will be noted that the entire device can be made on a power press in a very simple manner and that it is compact and light.

What is claimed is:

1. An exterior coupling for flanged pipe elements, the coupling comprising a band adapted to surround the two flanges and bimetallic retainers on the band [having] *comprising* lugs near the edges of the band curled toward the middle of the band and over the inner face thereof with free legs facing toward each other adapted to press against the flanges with a component of force coaxial with the coupling [, there being] *and* in each retainer inside the lug a curled piece of metal of a higher coefficient of expansion than the lug; *the end portions of said lugs and of said pieces of metal which are remote from said flanges being fixed against relative movement in a direction away from said flanges;* there being an indentation on the inner face of the band in which the free leg of the two opposite retainers rests, the curled pieces of metal of higher coefficient being thereby held against movement circumferentially of the band and the retainer also being limited in retraction *in directions away from said flanges.*

2. An exterior coupling for flanged pipe elements, the coupling comprising a band adapted to surround the two flanges and bimetallic retainers on the band [having] *comprising* lugs formed integrally near the edges of the band curled toward the middle of the band and over the inner face thereof with free legs facing toward each other adapted to press against the flanges with a component of force coaxial with the coupling [, there being] *and* in each retainer inside the lug a curled piece of metal of a higher coefficient of expansion than the lug; *the end portions of said lugs and of said pieces of metal which are remote from said flanges being fixed against relative movement in a direction away from said flanges;* there being an indentation on the inner face of the band in which the free leg of the two opposite retainers rests, the curled pieces of metal of higher coefficient being thereby held against movement circumferentially of the band and the retainers also being limited in retraction *in directions away from said flanges.*

3. An exterior coupling according to claim 1 in which each lug is formed integrally with the band at an edge of the latter and the leg of each *curled* piece of metal of higher coefficient nearest the band edge rests on the inner surface of the band while the free leg of the piece of metal is in the indentation; and each lug and curled piece of metal is as wide as the indentation but does not extend for the full width of the latter; whereby the free legs can move only crossways of the band, the indentation acts as a stop, and pressure on the flanges is maintained with a smaller change in band diameter.

4. An exterior coupling according to claim 1 in which the free legs of the lug and of the curled piece of metal of higher coefficient both fit in the indentation and there are strengthening extensions of the indentations extending toward the edges of the band.

*5. An exterior coupling for flanged pipe elements, the coupling comprising a band adapted to surround the two flanges and bimetallic retainers on the band comprising lugs near the edges of the band curled toward the middle*

*of the band and over the inner face thereof with free legs facing toward each other adapted to press against the flanges with a component of force coaxial with the coupling and in each retainer inside the lug a curled piece of metal of a different coefficient of expansion than the lug, the end portions of said lugs and of said pieces of metal which are remote from said flanges being fixed against relative movement in a direction away from said flanges; and there being an indentation on the inner face of the band in which the free leg of the two opposite retainers rests the curled pieces of metal being thereby held against movement circumferentially of the band and the retainers also being limited in retraction in directions away from said flanges.*

*6. An exterior coupling for flanged pipe elements, the coupling comprising a band adapted to surround the two flanges and bimetallic retainers on the band comprising lugs near the edges of the band curled toward the middle of the band and over the inner face thereof with free legs facing each other adapted to press against the flanges with a component of force coaxial with the coupling and in each retainer inside the lug a curled piece of metal of a different coefficient of expansion than the lug; the end portions of said lugs and of said pieces of metal which are remote from said flanges being fixed against relative movement in a direction away from said flanges; in combination with stops on the band positioned for engagement by the free legs of the two opposite retainers, said stops being so positioned as to limit retraction of said free legs in directions away from said flanges; whereby the temperature range in which the coupling remains tight is lengthened, as described.*

*7. An exterior coupling for flanged pipe elements according to claim 6, in which said curled pieces of metal are of a higher coefficient of expansion than said lugs.*

References Cited in the file of this patent or the original patent

UNITED STATES PATENTS

| | | |
|---|---|---|
| 2,271,425 | Harris | Jan. 27, 1942 |
| 2,575,213 | Fruth | Nov. 13, 1951 |